Patented Apr. 21, 1942

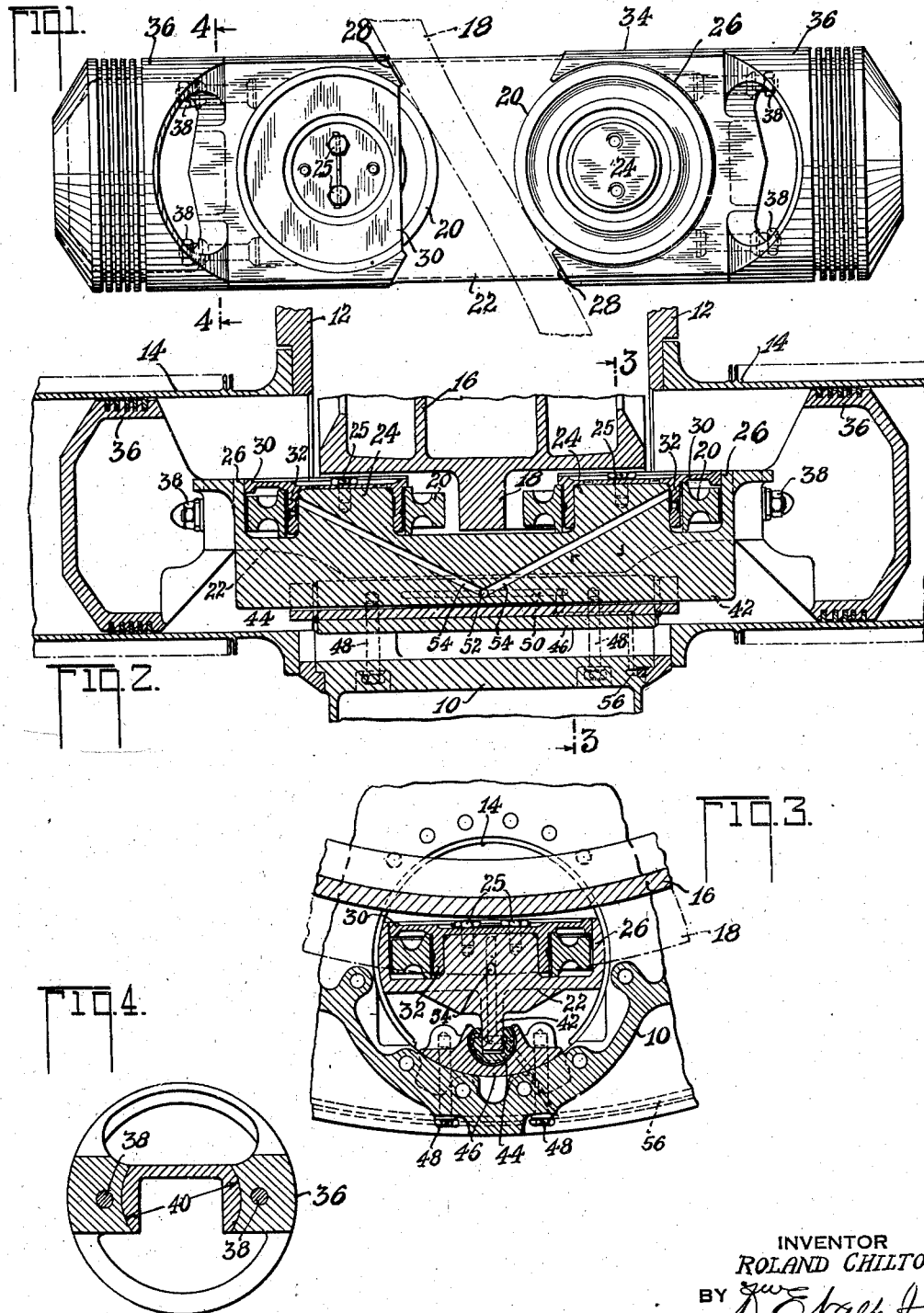

2,280,375

UNITED STATES PATENT OFFICE 2,280,375

PISTON MECHANISM

Roland Chilton, Ridgewood, N. J., assignor to Wright Aeronautical Corporation, a corporation of New York Application September 10, 1938, Serial No. 229,285

6 Claims. (Cl. 308—6)

This invention relates to improved piston means for cam operated barrel type engines and, in general, comprises improvements on the structure disclosed in my copending application, Serial No. 220,453, filed July 21, 1938, and in the application 229,281 filed September 10, 1938 in the names of Chilton and Taylor. In engines of the type here contemplated, the cylinders are arranged circumferentially around, and in parallelism to, a power shaft having an axially waved cam, the piston member carrying rollers engaged with respective sides of the cam.

A prime object of the invention is to provide improved piston connecting and roller supporting structure. Further objects and advantages of the invention will be obvious from or will be pointed out in the following description with reference to the drawing, in which:

Fig. 1 is a plan view of the piston structure, viewed radially of the engine shaft, a bearing being removed on the right hand side to expose a roller;

Fig. 2 is a section through the piston assembly and part of the engine structure;

Fig. 3 is a cross-section on the line 3—3 of Fig. 2, and

Fig. 4 is a detail section on the line 4—4 of Fig. 1.

The main engine housing consists of a drum, seen in fragmentary section at 10 to which are secured cylinder deck members 12 carrying cylinders 14. Rotatable within the housing 10—12 is a large cam member, the rim of which is indicated in section at 16 and includes a sinusoidal rib or cam proper 18, engaged with respective sides of which are piston rollers 20.

The piston assemblage includes a backbone or piston connecting member indicated in general at 22. The mid-portion of this member embraces the cam projection 18 and it is provided on either side thereof with integral trunnions or journal stubs 24 around which material is removed to define roller pockets having arcuate walls 26 surrounding the roller but open towards the cam facing sides of respective pockets for cam clearance as indicated at 28.

A roller bearing member comprises a plate portion 30 fitted to the walls 26 and an internal bearing shell portion 32 fitted over the stub 24. Screws 25 retain the bearing member in position.

Referring now to the cross-section of Fig. 3, it will be seen that the walls 26 on either side of the roller are profiled exteriorly to conform to the bore of the cylinders 14 to comprise a slipper surface slidable therein as indicated at 34, Fig. 1.

The pistons 36 are secured to respective ends of the piston member by suitable bolts 38, a locating pilot being provided as indicated at 40, Fig. 4.

The piston is restrained from rotation in the cylinder bores by an extended rib 42, Figs. 2 and 3, engaged in a rectilinear slot in a guide bar 44, in turn fitted in a circular seat in a bracket 46 secured to the main housing drum 10 by bolts 48. The guide 44 is provided with an oil groove 50, Fig. 2, past which slides a transverse hole 52 in the rib 42, the hole communicating with the piston roller bearing shells 32 by way of diagonal holes 54. Oil is fed to the groove 50 from a suitable oil channel 56 formed in the main housing drum 10 as shown.

One of the features of the invention resides in the simple form of the piston member wherein the integral stubs 24 and the surrounding pockets 26 are formed by turning or trepanning operations on common axes at respective ends. It will be seen that the explosion forces are carried from the rollers symmetrically to the pistons by the plate 30 fitted to the roller pocket bore on one side and by the integral union of the stub 24 with the member on the other side. The guide rib 42 provides for adequate bending stiffness where the piston member is offset to clear the cam and the integral construction of this rib with the roller trunnion 24 gives a structure of high strength and rigidity with moderate weight.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a piston structure comprising a central member having spaced-apart parti-annular pockets formed on one side thereof, an annular roller in each pocket, a cover for each pocket having portions in fitting engagement with the outer and inner cylindrical surfaces defining said pocket, the inner cylindrical surface of said annular pocket providing a bearing support for said roller, coaxial projections at the ends of said central member, and cylindrical pistons having concentric cylindrical faces in fitting engagement with said projections.

2. In a piston structure comprising opposed, concentric, axially spaced pistons, and a bridge member therebetween secured at its ends to said pistons, said member having a transverse slot for bridging an engine cam and having parti-annular pockets on each side of said slot and opening to said slot, each pocket defining a central stub and a cylindrical well, a roller supported by said stub and disposed in said pocket but projecting into said slot, and a cover element over said roller fitted and secured to said stub.

3. A roller carrier for a barrel engine piston comprising a member having a parti-annular groove therein defining a central stub, a roller carrying member comprising a plate fitted to the member at the parti-annular groove periphery and having an integral bearing sleeve fitted to said stub, and a roller member journalled on said sleeve and occupying the parti-annular pocket formed by the groove and plate.

4. A roller carrier for a barrel engine piston comprising a member having a parti-annular groove therein defining a central stub, a roller carrying member comprising a plate fitted to the member at the parti-annular groove periphery and having an integral bearing sleeve fitted to said stub, a roller member journalled on said sleeve and occupying the parti-annular pocket formed by the groove and plate, and means to secure the plate to the member.

5. In a roller carrier having a parti-annular pocket formed therein, the pocket embracing more than a semi-circle, and defining inwardly and outwardly facing cylindrical surfaces, respectively larger than the roller outside diameter and smaller than the roller bore means engaging and fitted to both said surfaces, and a roller journalled on the means disposed within the pocket for joint support by the means and carrier.

6. A roller carrier having a parti-annular open pocket embracing more than a semi-circle and defining a concentric stub, a member having a sleeve fitted to said stub and an integral flange of greater than roller diameter fitted to the pocket border, and a roller in the pocket journalled on said sleeve.

ROLAND CHILTON.